Feb. 10, 1925.

A. T. PRESCOTT 1,525,950

CARGO HANDLING APPARATUS

Filed May 5, 1922 9 Sheets-Sheet 2

INVENTOR.
Arthur T. Prescott

BY E. W. Marshall
ATTORNEY.

Feb. 10, 1925.

A. T. PRESCOTT

1,525,950

CARGO HANDLING APPARATUS

Filed May 5, 1922     9 Sheets-Sheet 7

INVENTOR.
Arthur T. Prescott
BY
E. W. Marshall
ATTORNEY.

Patented Feb. 10, 1925.

1,525,950

UNITED STATES PATENT OFFICE.

ARTHUR T. PRESCOTT, OF EAST ORANGE, NEW JERSEY.

CARGO-HANDLING APPARATUS.

Application filed May 5, 1922. Serial No. 558,633.

*To all whom it may concern:*

Be it known that I, ARTHUR T. PRESCOTT, a citizen of the United States, and a resident of East Orange, county of Essex, and State of New Jersey, have invented certain new and useful Improvements in Cargo-Handling Apparatus, of which the following is a specification.

This invention has as its principal purpose the provision of an apparatus for facilitating the transference of cargo between a dock and a ship whereby loading or unloading the latter may be accomplished in an unusually rapid and efficient manner.

A further object is to provide an apparatus capable of being controlled from a single station, that will operate at different levels and at variant points or stages with equal ease and convenience, and thus constitute a novel, comprehensive and flexible system of cargo handling.

Another aim is in the attainment of means whereby a wide variety of miscellaneous commodities may be effectively handled, and the provision of mechanism for loading and discharging automatically at selected stages.

These and other objects, such as simplicity, compactness, speed and control of operations, are attained by the invention, as may be seen from the embodiment thereof illustrated by the novel design, construction and arrangement of parts, hereinafter described and shown in the accompanying drawings, which form a material part of this disclosure, and in which:—

Stated briefly in general terms, the machine is designed for installation on a dock or pier, along which it moves in order to serve selected stations relative to an adjacent ship, where it can be used for continuously handling miscellaneous bales, crates and packages of considerable size and weight, in fact, the usual assortment of freight conveyed by a ship.

Four principal structural parts constitute the apparatus, namely;—the bridge 50, cantilever arm 150, ship leg 200 and pier leg 100, the latter being rigidly connected to the bridge.

The bridge moves upon rails surmounting the pier shed, parallel with the edge of the pier and carries a cantilever arm capable of transverse movement.

Mounted on the outer end of the cantilever arm is the ship leg, having means for vertical adjustment, and movable to or from the pier leg by operation of the cantilever arm; the ship leg, when the device is in operation, being adjustably supported by a deck frame on the ship.

Travelling conveyers, comprising trays having concave grid arms for their bottoms, capable of being automatically loaded and unloaded, are moved circuitously through the entire apparatus, irrespective of the adjusted length of the cantilever arm, in either direction, the conveying chains being arranged for lateral deflection as well as for bending around the carrier sprockets, the chains and carriers travelling on tracks in the cantilever arm, sections of the tracks being automatically supplied or removed by the extension or retraction of the cantilever arm. Emergency stops for the conveyer trays are provided at each landing station, where signals are sounded prior to starting and safety stops are also arranged to avoid excessive load interference with fixed parts of the frame. All the several movements of the apparatus are controlled from a single station, and means are provided for handling material too lengthy or bulky to be received in the trays.

Referring now more specifically to the drawings, the numeral 25 designates in general, a pier or wharf on which is a substantial shed 26, which may have one or more floors 27 and a roof 28 supported by outer and intermediate walls, as 29 and 30.

Figure 1:
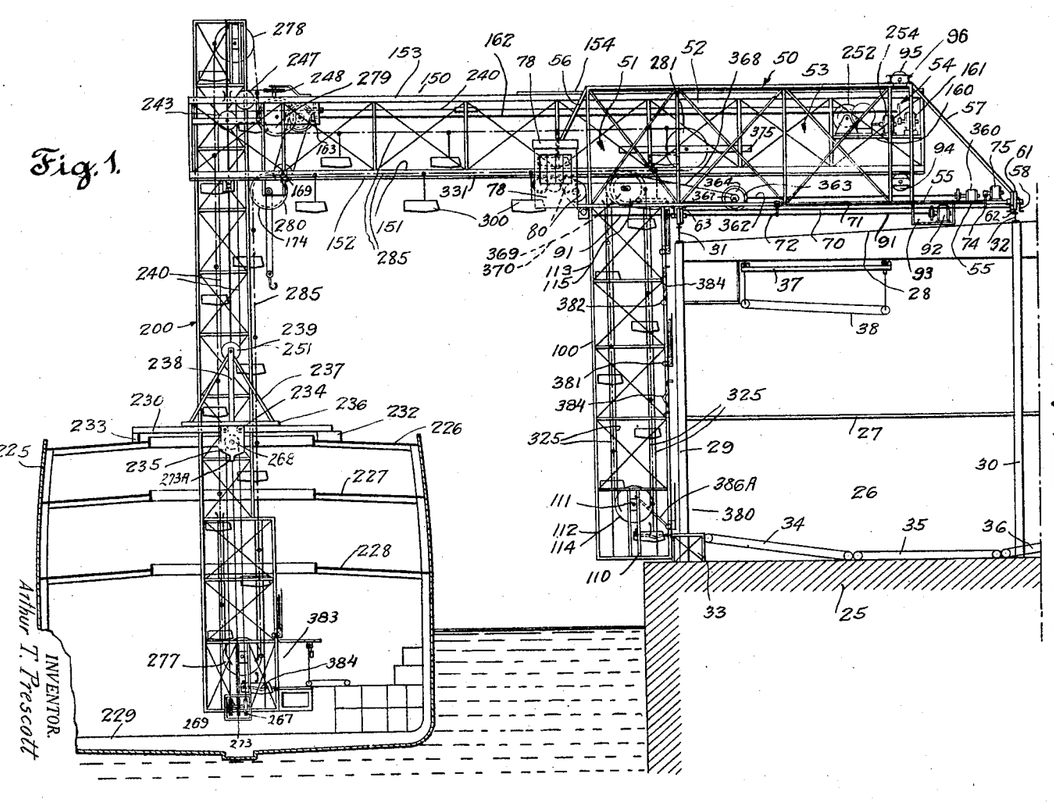
Fig. 1 is a side elevation of an apparatus embodying the invention and illustrating its characteristic features, as applied, the showing being mainly diagrammatic.

These walls extend above the roof and act as beds for relatively widely spaced beams 31 and 32 which extend longitudinally of the shed parallel with the edge of the pier, as shown in Fig. 1.

At the base of the front wall 29 is a raised elongated abutment 33 served by portable conveyers 34 and 35 leading to a stacker 36, the second and succeeding floors being provided with a longitudinal conveyer 37 and transverse conveyers 38, adjustably suspended from the floor or roof above, thus providing means for the rapid, convenient and economical handling of in-coming or out-going freight.

*The bridge.*

A rectangular structure, comprised of rolled steel shapes, characterized as a bridge and in general denoted by the numeral 50, is formed with four main sections 51, 52, 53 and 54 (Fig. 1) having opposed pairs of side members 55, extending in advance at the front and also at the rear, these extensions having diagonal braces 56 and 57 engaging the upper chords of the structure.

Extending transversely below the rear ends of the side base members 55 is a pair of channels 58, their projecting ends having mounted upon them housings 59 (Fig. 21) for axle shafts 60 to which are secured wheels 61, having extending peripheral flanges on both side edges, these wheels being adapted to travel over the track rails 62 carried on the beam 32.

Another pair of similar transverse elements 63 extend below the bridge at a point in advance of its center, the same carrying like housings and track wheels 61^A operative on the track rails mounted on the beam 31; thus the bridge is supported at four widely spaced points and may, if desired, have additional wheels carried by the front transverse elements 63.

Figures 2, 3, 4, 5, 21:
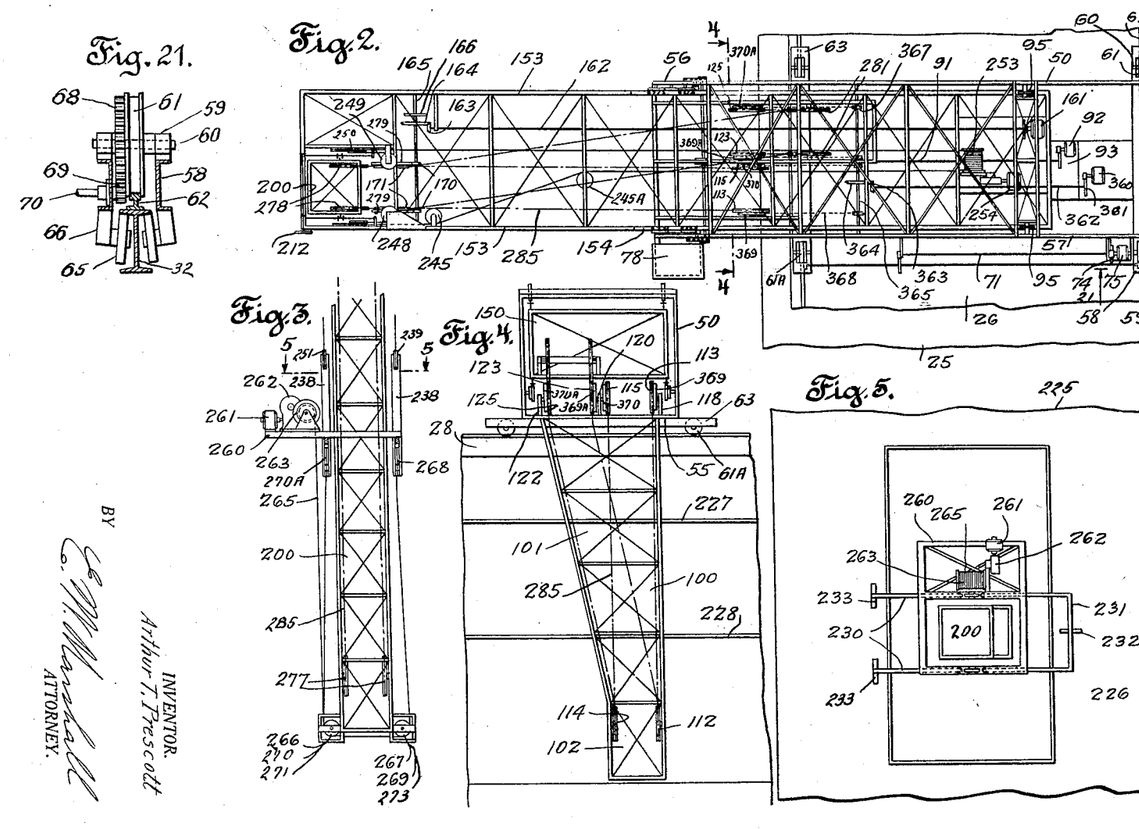
Fig. 2 is a top plan view of the same.
Fig. 3 is a fragmentary front elevation of that part of the apparatus known as the ship leg.
Fig. 4 is a sectional front elevation taken on line 4—4 of Fig. 2, showing the pier leg.
Fig. 5 is a transverse sectional view taken on line 5—5 of Fig. 3.
Fig. 21 (Sheet 2) is an enlarged transverse sectional elevation of the bridge lift rollers, and associated parts, the section being taken on line 21—21 of Fig. 2.

In order to prevent the wheels 61 from rising off the track rails, pairs of opposed idle wheels 65, mounted on axles inclined from the horizontal and carried in brackets 66 depending from the channels 58, are arranged so that their peripheries may contact with the lower surfaces of the upper element of the beam, as best seen in Fig. 21.

Fixed to the facing surfaces of the track wheels 61 and 61^A, on one side of the bridge, are spur gears 68, meshing with pinions 69 secured at the ends of a longitudinal shaft 70, carried in bearings on the adjacent base member 55, as is also a parallel shaft 71, these shafts being geared together as at 72.

The shaft 71 is driven by reduction gears 74 actuated by an electric motor 75 located at the rear end of the structure, over the side member 55, as shown in Fig. 1.

The forwardly extending end members 55 of the bridge have built upon them a laterally outstanding cabin or operator's station 78 from whence all the several operations of the entire apparatus are controlled.

Revolubly mounted in elements of the vertical side frame of the bridge, midway in its front section 51, (see Fig. 8) are spindles carrying flanged wheels 80, having rigidly attached to their outer sides, adjacent the frame members, spur gears 81.

Meshing with these gears are pinions 82, mounted on spindles housed in, and extending through, the bridge side frames, the spindles having secured on their projecting ends, chain sprockets 83 over which run endless chains 84, driven by sprocket pinions 85, fixed to opposite ends of a shaft 86, carried in bearings attached to the lowermost front transverse beams 63 of the bridge.

Rigidly secured intermediate the length of the shaft 86, is a worm wheel 88 meshed with a worm 89 extending through a bracket 90 and fixed to a shaft 91, extending longitudinally of the bridge, in the center thereof and driven by a motor 92 mounted in a frame 93 extending below the bridge beyond its section 54, as best seen in Figs. 1 and 2.

A pair of wheels 94 having flanges on both edges, are rotatably mounted in the lower portion of the bridge section 54, the peripheral faces of the wheels being in the same plane as that of the wheels 80 and also in lateral registration with them.

A third pair of similar track wheels 95 are mounted in brackets 96 over the bridge section 54, in vertical register with the wheels 94.

Pier leg.

Figure 8:
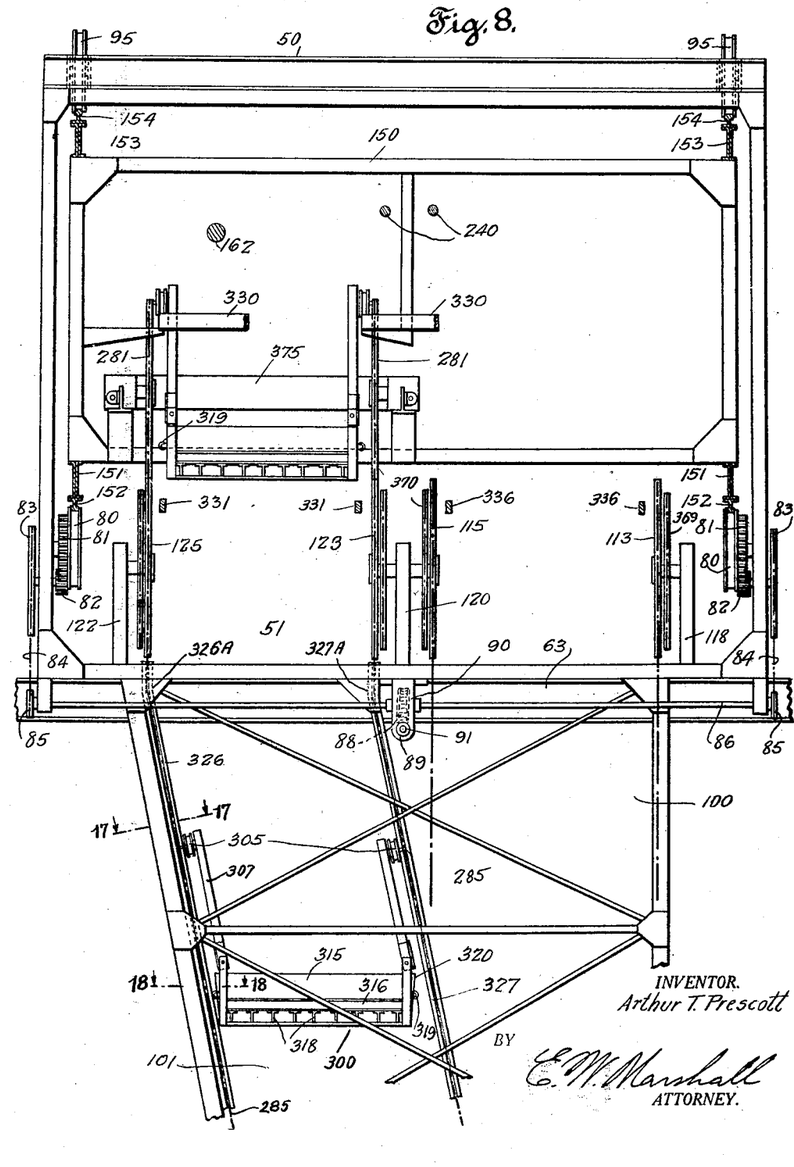
Fig. 8 is a sectional front elevation showing the cantilever, its supporting frame and depending pier leg element, taken on the same plane as Fig. 4, but drawn to a greatly enlarged scale.

The pier leg 100, shown best in Figs. 1, 4 and 8, is actually a component of the bridge, extending rigidly down from the base of its overhanging front section 51, contiguous to the front of the shed 26 to clear the pier 25.

The right hand side of the leg, facing the pier, contains the vertical path of the conveyer the same being in a plane substantially equivalent to that of the corresponding side of the bridge structure, while the opposite side element 101 starts from a similar point, at the left hand side of the bridge and extends diagonally downward to the lowermost section 102 of the pier leg, said section 101 having parallel sides.

Like the bridge, the skeleton frame of the pier leg is formed of rolled steel structural shapes rigidly braced by lattice elements riveted in the usual manner.

Obviously, if it be required, the pier leg may be provided with a reinforced and stiffened column having at its foot one or more wheels contacting with a track rail fixed near the outer edge of the pier 25, in which case the pier leg would transmit a material portion of the weight of the superstructure to such a rail.

Extending centrally between the chords of the lower section 102, on both sides thereof, are vertical posts 110, (Fig. 1) acting as guides and supports for blocks 111 mounting sprocket wheels 112 and 114. A similar pair of smaller diametered sprockets 113 and 115 are mounted on the bridge so that their faces, adjacent the pier, are in register with the corresponding faces of the sprockets 112 and 114, below them, said sprockets 113 and 115 being carried on supports 118 and 120 from the floor or lower elements of the bridge.

It is to be noted that a straight vertical passage is formed in the right hand side of the pier leg facing the pier, between the sprockets 113—115 and 112—114. In the adjacent angular side 101, is a similar but diagonally disposed passage extending from the sprockets 112—114 in the lower section 102, up through the bridge section 51, to sprockets 123 and 125, as shown in Figs. 2 and 8.

A third support 122 is fixed on the opposite side of the bridge bottom and said sprockets 123—125 are carried by the supports 120 and 122, their faces, adjacent the water, alining with the corresponding faces of the sprockets 112 and 114, due to their axes being slightly offset from that of the sprockets 113 and 115, the axes of both pairs of upper sprockets being in the same horizontal plane.

The cantilever arm.

The cantilever, generally designated by the numeral 150, is an elongated rectangular structure slidably mounted on the bridge, presenting a clear open longitudinal passage through its lower portion.

Figure 7:
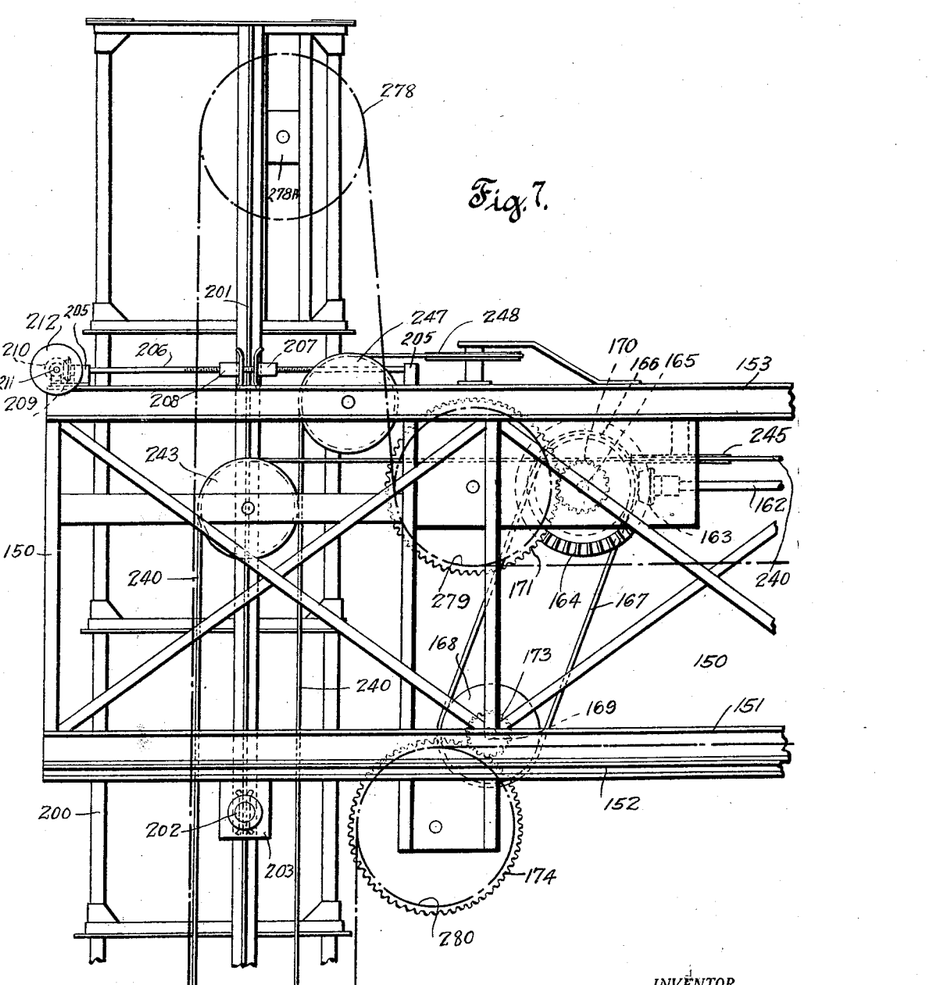
Fig. 7 is a side elevation of the same.

Pairs of channels 151 (Figs. 1, 7 and 8) extend in unbroken length below the side edges to which are secured inverted track rails 152, their heads resting on the wheels 80 and 94 and, as it has been shown that the wheels 80 are capable of being driven, it will be seen that the cantilever may be moved in the direction of its length with respect to the bridge and that it travels with the bridge along the pier.

Another pair of channels 153 form the upper chords of the cantilever, the same being surmounted by track rails 154, the heads of which are engaged by the wheels 95. It will be noted, however, that the upper track rails need extend only over the rear half length of the chords, as shown in Fig. 2.

Near the outer end of the cantilever arm may be attached any ordinary lifting device, as a block and fall, the same being used in raising or lowering articles of such nature as are precluded from being handled by the trays hereafter described.

At the pier end of the cantilever is a raised platform 160 on which is mounted a motor 161, geared to drive a shaft 162 extending longitudinally through the upper portion of the cantilever arm structure, at one side thereof, to a point near the front and has fixed to it a bevel pinion 163.

This pinion meshes with a bevel gear 164, mounted on a transverse shaft 165, journaled in the frame and having affixed near its left hand end a chain sprocket wheel 166, over which is a chain 167 communicating motion to another sprocket wheel 168, fixed on the end of a shaft 169, journaled below and slightly in advance of the shaft 165, the purpose of which will be further on described.

The ship leg.

The ship leg 200 is adapted to slide vertically through the end of the cantilever at its front end and is provided with T-shaped guides 201 (Figs. 6 and 7) on the opposite sides of its frame, adapted to engage in trunnions 202 pivotally mounted in elements 203 extending adjacently down from the cantilever.

On the upper elements of the cantilever are fixed bearings 205 for shafts 206, screw-threaded right and left hand and fitted with opposed jaws 207 and 208 by which the extending elements of the T guide rails 201 may be closed when desired, as in adjusting or placing the ship leg in position, the normal condition of the jaws being apart to permit limited swaying of the leg, due to the movement of the ship.

The outer ends of the shafts 206 have fixed upon them bevel gears 209, meshing with mating gears 210 fixed on a transverse shaft 211, at the extreme front upper corner of the cantilever, an extending portion of the shaft 211 having secured to it a sprocket 212 over which may be trained a chain, (not shown) which may be actuated by a motor controlled from the operating station for impelling the jaws.

The ship, generally denoted by the numeral 225, (Fig. 1) is moored to extend parallel with the pier 25 at a slight distance from it, and as indicated may have upper, intermediate and lower decks, respectively 226, 227 and 228 below which is the hold 229.

The ship leg is adapted to extend through the hatch-ways in the several decks and is supported on a deck frame (see Figs. 1 and 5) comprised of two parallel bars 230, connected by a cross bar 231 at one end, the center portion of which rests on a block 232 on one side of the hatch-way in the upper deck 226, while the opposite, unconfined ends of the bars 230 rest upon blocks 233 on the opposite sides of the hatch-way, thus providing a three-point bearing.

The bars 230 are formed in two sections, each of which, at their adjacent ends, are secured by pivots 234 to plates 235, thus permitting the bars to hang against the ship leg when not in use.

The plates 235 are secured rigidly to the lower side of a horizontal frame 236, having triangularly disposed elements 237, between which are posts 238 carrying sheave pulleys 239, over which are trained the bights of a cable 240.

The outer front portion of the cable passes up through the leg, over an idle pulley 243, rotatable in the upper part of the cantilever, and then horizontally, making contact with the guide pulleys 245, 245ᴬ (Fig. 2) to the rear.

The corresponding inner front portion of the same cable extends parallel upwardly and over a pulley 247, thence around a guide pulley 248, carried on the upper surface of the cantilever arm, across the arm to another pulley 249 and then over a pulley 250 and down to and under a pulley 251, opposite pulley 239, forming a bight corresponding to that on the other side of the frame, and continuing upwardly over a pulley 252 opposite pulley 243, and thence horizontally to the rear, where both ends of the cable are wound upon a drum 253, driven by the main hoist 254 on the platform 160. Thus means are provided for raising and lowering the ship leg and avoiding the use of equalizing devices.

The deck frame is extended at the left and provided with a partial platform 260, mounting a motor 261 driving a reduction gear train 262, operatively engaged with a drum 263, on which is wound a cable 265 leading down to the bottom of the ship leg 200, under a pulley 266, journaled on the left hand side thereof; then passing across to the right hand side, under a pulley 267, up to a pulley 268 journaled in the right hand side of the deck frame. The cable then passes down, in a parallel plane, around a pulley 269, journaled on the same axis as the pulley 267, then across to the left side around a pulley 270, thence up and over another pulley 270ᴬ, opposite the pulley 268, and then down around the pulley 271, between the pulleys 266 and 270, thence across to the right under a pulley 273 between pulleys 267 and 269 and up to a point 273ᴬ just below the pulley 268 where it is secured to the deck frame.

Thus it will be evident that the ship leg may be adjusted vertically with reference to the deck frame, or that the leg and frame may be raised or lowered as a unit by the means previously described.

The lower sections of the ship leg are extended on their rear side and in the bottom sections are pairs of opposed posts 275, (Fig. 9) similar to the posts 110, of the pier leg, and having between them vertically adjustable blocks 276 in which are rotatably mounted sprocket wheels 277.

Similar sprockets 278 (Figs. 1 and 7) are likewise provided near the top of the ship leg in register directly thereabove, mounted in vertically adjustable blocks 278ᴬ, and in the outer end of the cantilever arm is another pair of sprockets 279 in fixed bearings in such manner that the adjacent faces of each pair are in vertical register.

Directly below the sprockets 279 is another pair 280, mounted in housings extending down from the arm, the outer faces of the sprockets 280 being substantially in the vertical plane of the rear faces of the sprockets 277 and their upper faces in the same horizontal plane as the sprockets 113 and 115, carried by the bridge at the upper end of the pier leg 100.

Still another pair of sprockets 281 is mounted in the cantilever arm sides, at points landward of the centers of the sprockets 123 and 125, when the arm is in its extreme extended position.

The sprockets 281 are larger than those hitherto mentioned and so mounted that their upper faces are substantially in a horizontal plane with the lower faces of the sprockets 279, while their lower faces are in the plane of the upper faces of the sprockets 280, 123 and 125, the arrangement being clearly shown in Fig. 1.

Figures 14, 19:
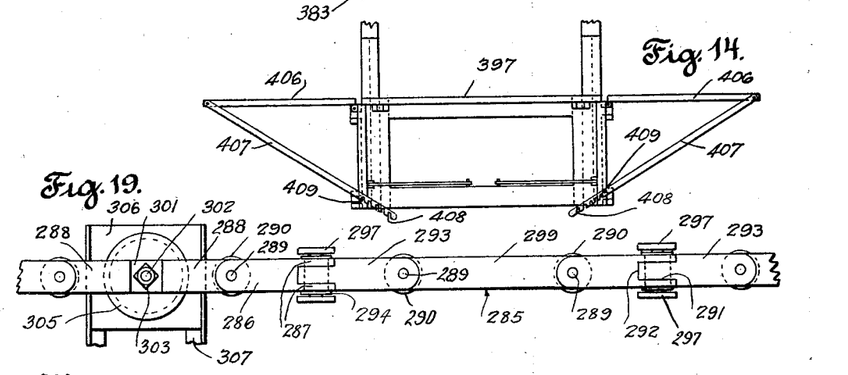
Fig. 14 is a rear elevation of some of the parts shown in Fig. 13.
Fig. 19 (Sheet 7) is a side view showing a part of the hoist chain.
Figure 20:
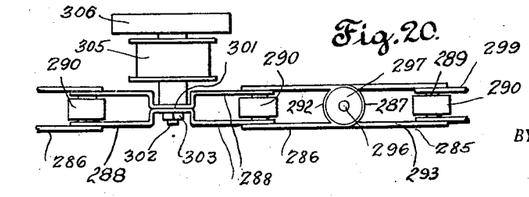
Fig. 20 is a partial plan view of the same.

Endless roller chain belts 285 are trained over the several pairs of sprockets, the construction of these chains being best shown in Figs. 19 and 20. These comprise a plurality of straps 286, each being bent to form a loop 287, its ends being rounded and overlapping the ends of a pair of straps 288 with which they are pivotally connected by a stud 289 and rotatably mounted on the stud, between the straps 288 is a roller 290.

The loop end 287, has a recess 291, containing the tongue-like loop 292 of another strap element 293. Passing through these loops is a pivot 294 flattened on opposite sides and having extending flanges engaging the outer surfaces of the link loop 287, both ends of this pivot extending slightly outward.

This construction permits the insertion or removal of the pivot when the link elements are moved toward one another, but holds the pivots when the chains are stressed.

A bolt 296 passes centrally through the pivot 294 and mounted on its extending ends are narrow guide rollers 297, held adjacent the ends of the pivot.

The ends of the looped link elements 293 are coupled to strap element 299 by a stud 289 carrying another roller 290, which in turn is coupled with another of the short strap links 286 in a similar manner.

It is to be noted that the links 299 are full length, that is, the center distance of the studs 289 is equal to the distance between the centers of the teeth of the several sprocket wheels; also that the alternate links are made in two sections 286, and 293, pivotally connected at their centers on axes at right angles to that of the roller connection 296, thus enabling the chains to be deflected at an angle on approaching or leaving the sprockets.

Conveyors or trays 300 are attached, at regular spaced intervals a predetermined distance apart, to the links 288, the sides of which are pinched together as at 301, in which are secured pins 302 by nuts 303.

Rotatably mounted on bushings, carried by the pins 302, are flanged wheels 305 adapted to guide and support the chains by reason of their contact with tracks further on described.

These pins 302 are secured in plates 306 bolted to the upper ends of arms 307, spread apart at their lower ends and engaged by hinge elements 308 to the upper edges of the side plates 309 of the trays. (See Figs. 9 and 16.)

These plates, which are level on their upper edges, extend diagonally outward to their front corners and then slope slightly downwardly directly below the points of suspension, and thence slightly upward to their rear edges which are at right angles with the top edges.

Figures 12, 13:
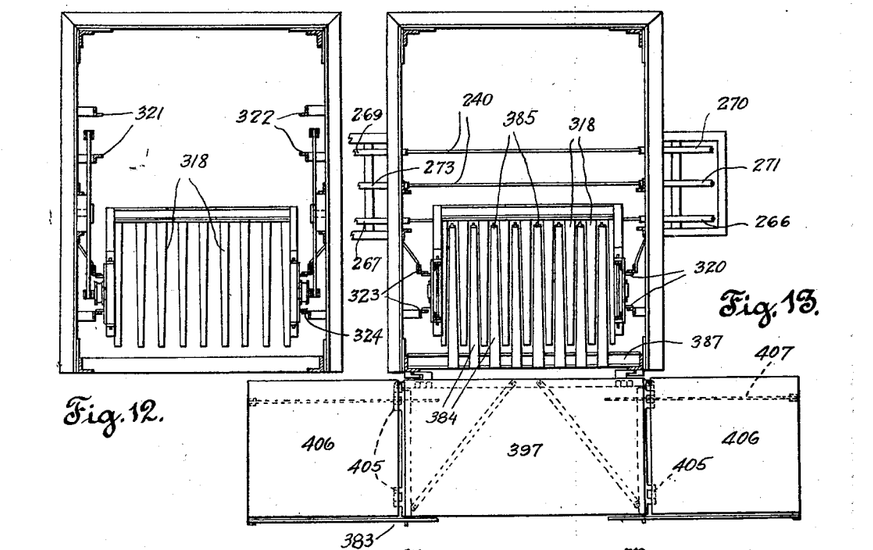
Figs. 12 and 13 are sectional plan views of the ship leg taken respectively on lines 12—12 and 13—13 of Fig. 9.

Between these plates 309, at the rear extends a back wall 315 reinforced by a beam 316, below which is a channel 317 and intermediate the beam and channel are secured the rear ends of a plurality of T angles 318, bent to present a concave upper surface, deepest in the plane of suspension, whereby a cylindrical object may be safely seated. These T angles 318 are separated from one another, except at their rear ends (Fig. 12).

It is to be understood that the several elements constituting the tray structure are substantially and rigidly connected by appropriate bolts and rivets presenting in plan a series of prongs or extending teeth upon which a very considerable load may be placed.

Guide rollers 319 are pivotally mounted on brackets which are affixed to the side plates 309 which contact with the guide rails, about to be described, to facilitate the lateral turning of the trays and prevent dragging.

Extending laterally outward from the side plates 309 are vertical guides 320, arranged in pairs equidistant from the plane of suspension and adapted to contact with fixed angles 321 and 322, arranged vertically in parallel at the rear of both the ship and pier leg, similar pairs of guides 323 and 324 being disposed at the front. One of each set of fixed guides terminates at proper points to permit the trays to move around the sprockets at the extremities of the legs.

It will also be observed that the inner angle rails 323 are bent inwardly at their bottoms so as to assure entrance of the guides 320 and the opposite, front rails 322 terminate at a point slightly below the axis of the sprocket wheels. (See Fig. 9.)

Figure 6:
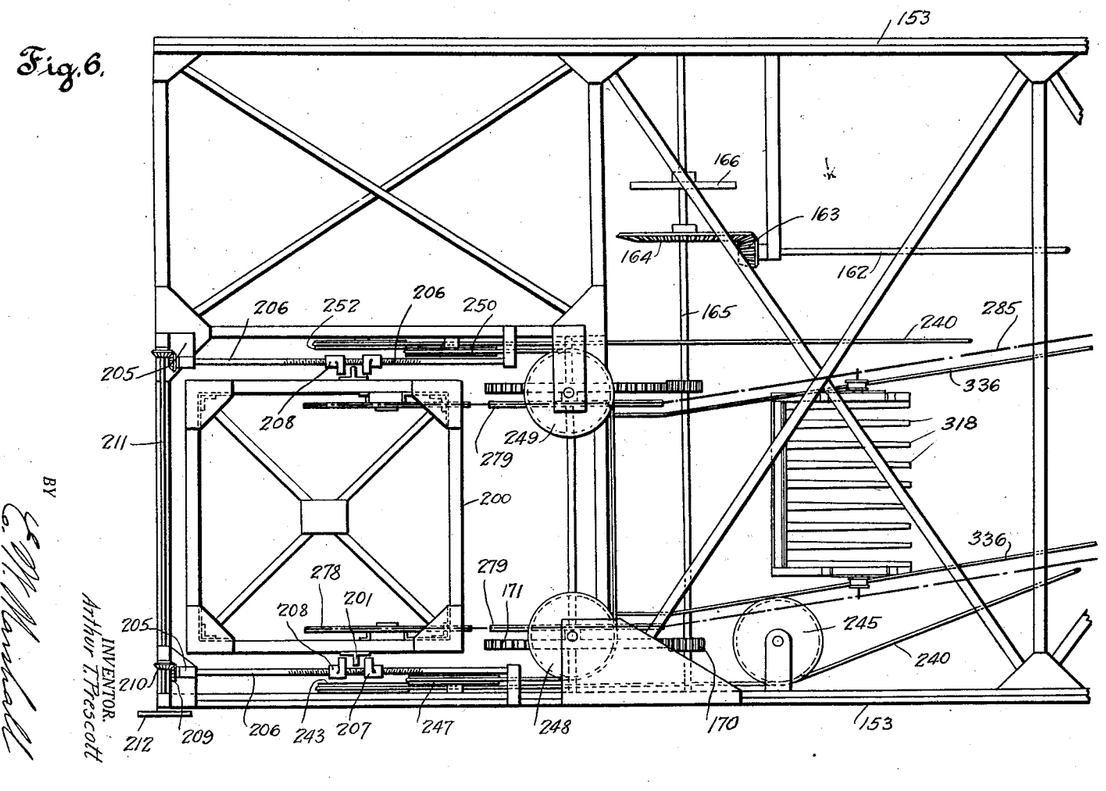
Fig. 6 is an enlarged plan view of the extended outer end of the cantilever frame as assembled.
Figures 9, 10, 11, 17, 18:
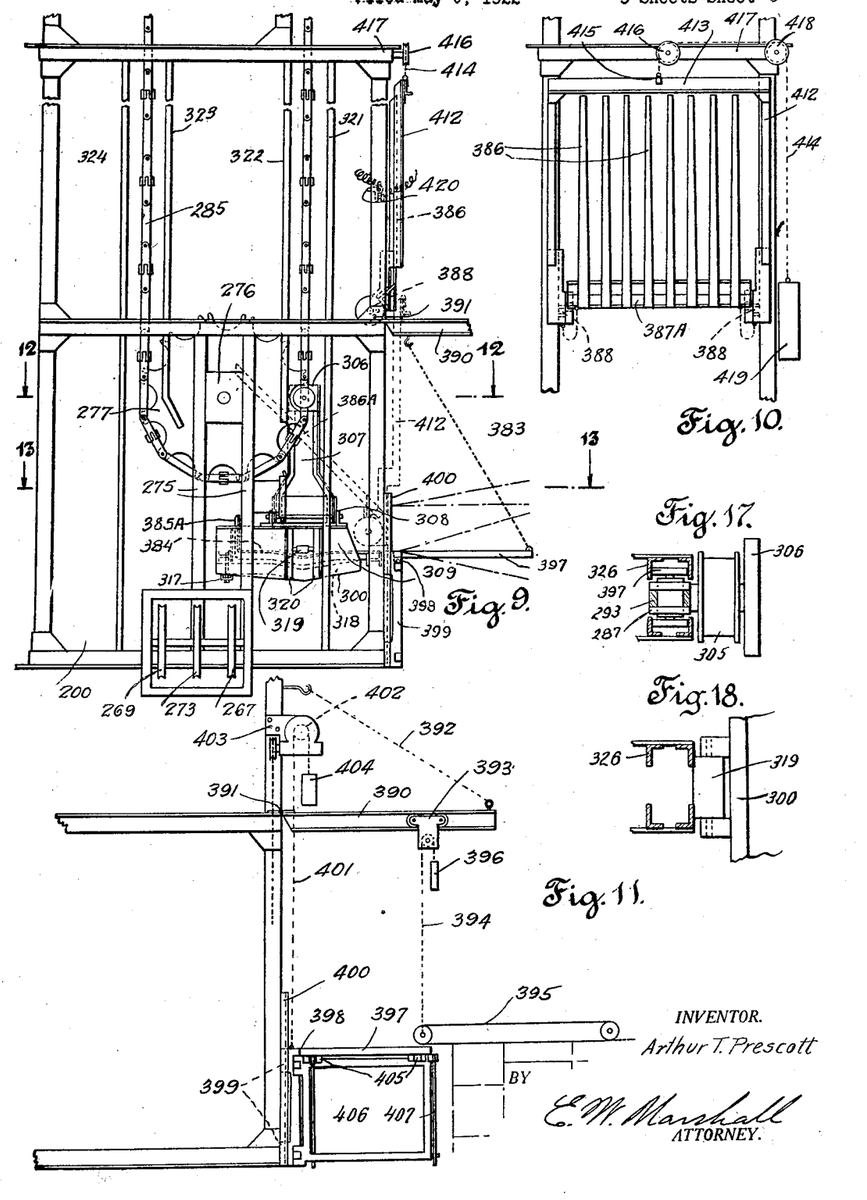
Fig. 9 is a partial side elevation showing the lower end of the ship leg.
Fig. 10 is a rear elevation of a part of the ship leg showing some of the parts illustrated in the upper portion of Fig. 9.
Fig. 11 is a view similar to Fig. 9 showing a modification of the freight handling devices.
Fig. 17 (Sheet 6) is a sectional plan view of a detail of the pier leg, the section being taken on the line 17—17 of Fig. 8.
Fig. 18 is a similar sectional view taken on line 18—18 of Fig. 8.

As indicated in Figs. 6 and 9, the upper, outward path of the chains and trays, through the cantilever and upward in the pier leg, diverges angularly from the return path. This is accomplished in the following manner.

Attached to the perpendicular frame 100 of the pier leg are spaced pairs of opposed angles forming box-like guides 325 between which the chain rollers 290 operate, these guides terminating adjacent the sprocket wheels.

A similar spaced pair of like guides 326 are attached to the frame element 101, and spaced parallel to them on the opposite side are other guides 327; thus along the inclined path both chains are guided and constrained to follow the divergent passage which terminates at the sprockets 123 and 125. These guides are curved at 326$^A$ and 327ᴀ just below the sprockets 123 and 125, to deflect the chain from the inclined to the vertical direction.

From thence the chains travel in a horizontal plane over the sprockets 281 and diagonally towards the ship leg, converging over the lower run of the chains to the sprocket 279.

In traveling longitudinally through the arm, the chain carried wheels 305 in the upper, outgoing path, rest upon rails 330, the rear ends of which are near the upper parts of the rear pair of sprockets 281, rearward of the ends of the inclined passage in the pier leg and the front ends of which are near the lower parts of the sprockets 279, so that they are at an angle with the cantilever arm sides.

A lower pair of rails 331 receive the chain carried rollers directly and extend intermediate the ends of the inclined passage of the pier leg to points below the sprockets 281, in any of their positions.

Parallel with the rails 331, at the front of the cantilever arm, are other pairs of rails 336 starting from points over the vertical passage in the pier leg and extending parallel with the cantilever arm, level with its lower chord, to points above the sprockets 280 at the front.

It will be noted that the track rails supporting trays traveling between the pairs of sprockets 113, 115 and 280 must be adjustable as to length owing to the movement of the cantilever.

Figure 15:
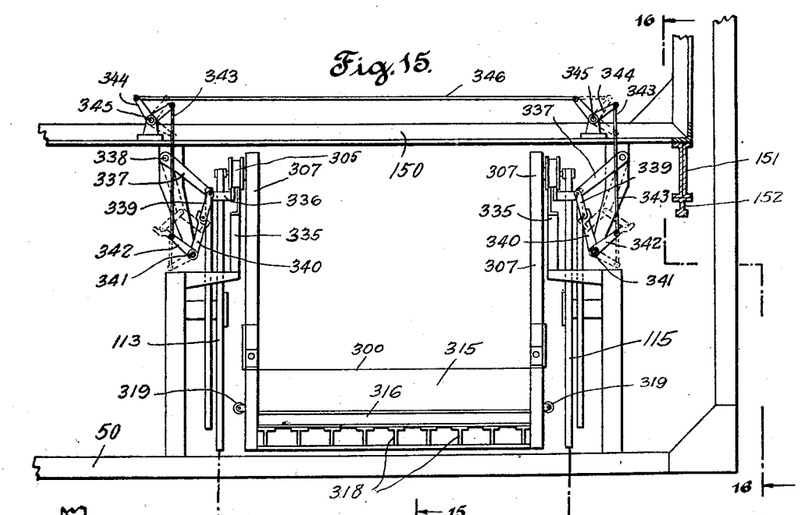
Fig. 15 is a fragmentary sectional rear elevation taken on line 15—15 of Fig. 16, showing the chain sprockets and automatic means for positioning adjustable sections of track in the cantilever.
Figure 16:
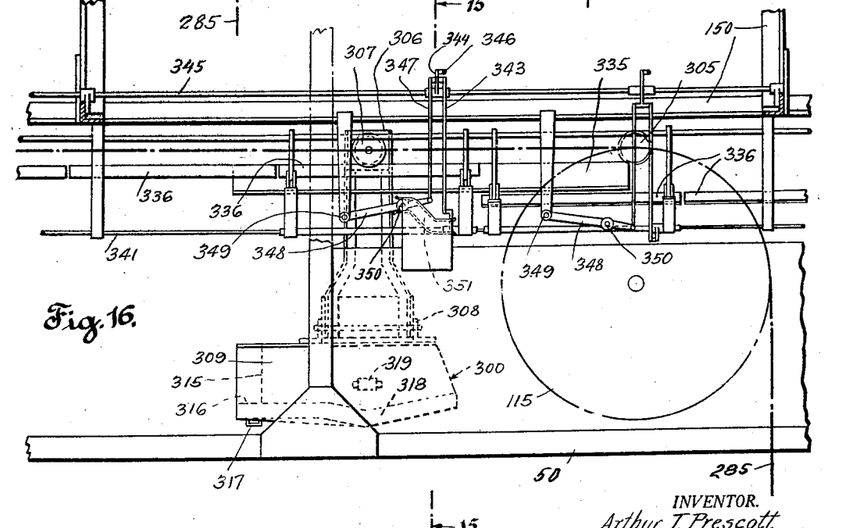
Fig. 16 is a partial side and sectional view of the tray-rack, taken on line 16—16 of Fig. 15.

This is accomplished by the means shown in Figs. 15 and 16, in which short sections of permanent track rails 335 are rigidly secured to the bridge structure, these sections being of sufficient length to support the chains and trays when the cantilever arm is moved to its extreme inward position and the ship leg is brought closely adjacent to the pier leg.

As the cantilever is moved outwardly, carrying the ship leg with it, a plurality of short track sections 336 are brought into operative position successively by automatic means which will now be described.

The track rail sections 336 are carried at the ends of lever arms 337 pivoted on shafts 338 revoluble in the lower chord of the cantilever, these arms having attached to them pivoted links 339, connected at their lower ends with levers 340 rigidly mounted on shafts 341, these elements constituting toggle joints as will be seen.

The shafts 341, which are rotatable in bearings carried on the cantilever, are operated by levers 342 connected by link rods 343 to bell-crank levers 344, fulcrumed on shafts 345 carried by the cantilever, the other arms of the bell-crank levers being connected to operate in unison by the rods 346.

Also engaging the operative arms of the bell-crank levers, are links 347, opposite the rods 343, the lower ends of the links 347 being pivotably engaged to the free ends of cam levers 348 pivotally mounted on studs 349 set in the cantilever frame, these levers having rollers 350 revolubly attached to their sides, the rollers being engageable in the groove of a cam 351 fixed rigidly to the bridge frame near its outer end.

In Fig. 16 the track rail section 336, at the right hand side, is shown down or in an inoperative position, while the adjacent section to the left is shown raised, due to the passage of the roller through the cam; thus it will be seen that as the cantilever is moved through the bridge, succeeding sections of the track rails are moved into position to receive the chain carried rollers or moved down and out to permit passage of the sprockets, according to the direction the cantilever is moved.

Two independent and differently located drives for the conveyor chains are used, one consisting of a motor 360 located on the bridge near the center of its inward extremity, adjacent the motor 75, the same being connected by spur gears 361 to a shaft 362 extending horizontally of the frame and driving a bevel pinion 363 meshing with a bevel gear 364 on a transverse shaft 365. This shaft 365 has fixed to its sprockets 367 driving chains 368, communicating motion to sprockets 369 and 370 attached to the sides of the tray chain sprockets 113 and 115, and sprockets 369ᴀ and 370ᴀ attached to the sides of tray chain sprockets 123 and 125 (Fig. 4).

The other drive is by the motor 161, shaft 162, bevel gears 163—164 and transverse shafts 165 and 169, the former of which has secured to it pinions 170 meshing with spur gears 171 secured at the sides of the tray chain sprockets 279, and the shaft 169 has upon it spur pinions 173 meshing with gears 174 fixed to the sides of the tray chain sprockets 280.

Thus the tray chains pass over four pairs of driven sprockets viz. 279, 280, 113—115 and also over two pairs of vertically adjustable idler sprockets 277—278, a pair of idler sprockets 114, having fixed centers, and a final pair of idler sprockets 281 slidably mounted on a frame 375 on the cantilever arm, provided with adjusting means (not shown) to take up slack in the conveyor chains and maintain them under proper tension.

Referring now to Figs. 9 and 11, showing embodiments of the loading devices, a pair of beams 390 are pivoted on the axis 391 to the ship leg, these beams being foldable vertically upward alongside the leg, or extended horizontally as shown in the full lines. When so extended they are supported by chains 392, engaging eyes fixed in the beams near their outer end, and hooks fixed in the ship leg as shown.

Wheeled travelers 393 are arranged to move longitudinally of the beams, carrying pulleys over which are trained chains 394, engaged with the end of a portable conveyor 395 in such manner as to support the same, the chains being provided with counterbalancing weights 396, thus affording means for raising or lowering the conveyors, as well as permitting them to move into desired proximity with the ship leg.

A platform 397 is hingedly engaged as at 398, at its rear longitudinal edge to a slide 399, mounted to move vertically on guides 400, fixed to the ship leg, the weight of the movable parts being supported by chains 401, passing over sheaves 402 carried in brackets 403 fixed to the ship leg, and counterbalanced by weights 404.

Attached by hinges 405 to the ends of the platform 397 are extending plates or leaves 406, their outer ends being supported by pivoted struts 407, having notches 408 at their lower ends adjustably engageable with pins 409 fixed in the lower elements of the platform, as best seen in Fig. 14.

This construction enables the platform 397 to be folded upward alongside the ship leg and the platform extensions 406 folded along the sides, thus occupying no appreciable space and not interfering with the movement of the ship leg, but affording a convenient loading platform when extended.

It is also to be noted that the platform 397 may be extended at an angle, as indicated in Fig. 9, either when raised or in its lowermost position, thus facilitating loading of cylindrical objects, as barrels and the like, directly upon the advancing trays.

Stations for loading and discharging the trays are indicated at 380, 381 and 382 as they pass through the pier leg and one or more similar stations 383 are provided in the ship leg.

At each of these stations where articles are to be loaded onto the conveyor is a frame comprising a plurality of fingers 385 spaced to permit the bucket fingers 386 to pass between them freely. These are of substantially the same shape as the bucket fingers except they are turned up at their outer ends as at 385A. These are pivoted to be swung out of the way as at stations 381, 382 (Fig. 1) or into operative position as shown at stations 380, 383 (Figs. 1, 9 and 13). The loading fingers at the lower station 383 of the ship leg are not pivoted as only unloaded trays pass this station. But here they are affixed to a fixed bar 387.

The articles to loaded are placed upon these loading fingers 385 in the path of the trays 300 which approach them from beneath when the conveyor chains are driven in the proper direction, picked up, by the fingers 318 of the trays, and carried thereby to the desired point of discharge.

The unloading fingers 386 (Figs. 9 and 10) are attached to angle beams 387A, provided at their ends with trunnions 388 so that they may be turned upwardly when not in use, the trunnions being mounted in an open rectangular frame having sides 412, joined at their upper ends by an angle bar 413, arranged to clear the leg frame on which the trunnions are mounted to slide for obtaining height adjustment.

A chain or cable 414 is attached to an eye 415, fixed at the center of the cross bar 413, the chain passing over a pulley 416 journaled on a stud fixed in one of the cross bars, as 417, of the leg frame, the chain continuing over another pulley 418, at the end of the bar 417 and then extending down to a counter-weight 419.

Thus the unloading fingers may be adjusted vertically with respect to the legs with which they are connected, and also are capable of being tilted at an angle as indicated at 386A in Figs. 1 and 9, to enter between the grid elements 318 of the trays when the trays approach them from above to intercept any load carried by them, transferring the goods automatically, largely by gravity, due to their inclination, all of the several parts being so placed as to avoid interference with articles being unloaded from the trays, it being understood that the chains and trays operate in either direction with equal facility.

Should the load applied to the trays inadvertently extend outwardly to a distance liable to cause damage by contact with the various parts of the leg frame, safety stops, as 420 (Fig. 9) are provided, the same being adapted to extend into the frame an amount to provide safe clearance and if contact is made with them by articles carried on the tray, the stops are arranged to break an electric circuit and thus stop the hoist motors instantly.

Figure 22:
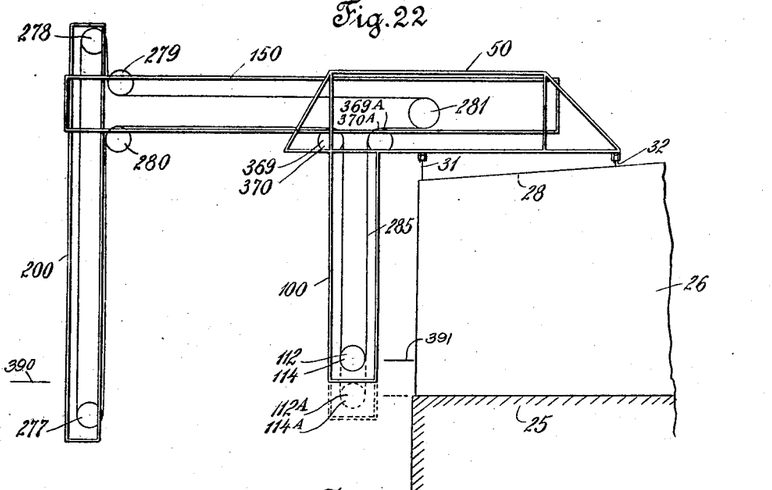
Figs. 22 and 23 (Sheet 9) are diagrammatic side elevations of two modified forms of construction.
Figure 23:
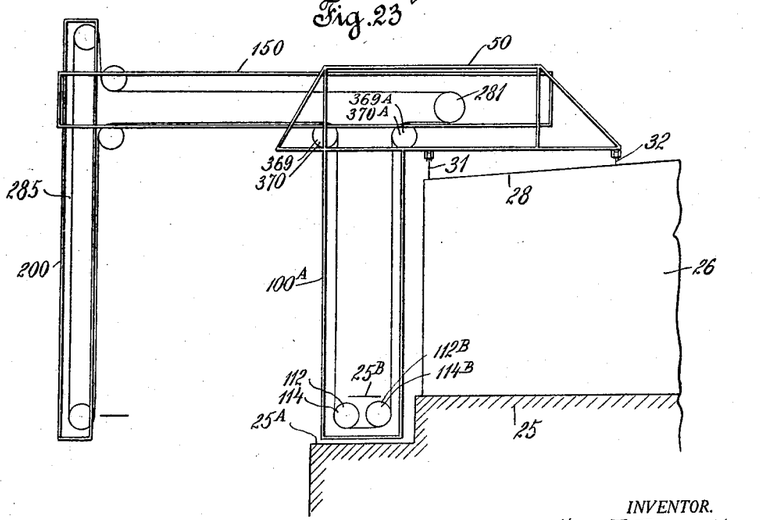

It is not necessary for the purpose of utilizing this invention, to have portions of the conveyor offset laterally, as under certain conditions the structures shown in Figs. 22 and 23 may be used. In these figures the axis of sprockets 369 and 370 are spaced from the axis of sprockets 369A, 370A. When the arrangement shown in Fig. 22 is used the direction of movement of the conveyor chain will be such that the loading or unloading fingers at some of the stations will be inoperative so that they must be removed and the freight placed on or taken from the trays manually or by other means. The speed of the conveyor will be slow enough to make this practicable with light packages. The loading station may be placed at 390 and the conveyor operated as shown in Fig. 1 except that the trays in this case will travel in the outside path of the conveyor shown and around a greater number of sheaves and will eventually reach an unloading platform at 391. If the pier leg 100 is outside of the outer edge of the pier as shown in Fig. 22 the lower sprockets therein may be in the position in which they are indicated at 112 and 114, which is similar to that shown in preceding figures, or they may be lower, as indicated at 112^A, 114^A, so that loading and unloading may be accomplished at the level of the pier floor.

When the pier is constructed with a depressed string piece 25^A, the pier leg 100^A may be made wider, in which case, sprockets 112^B, 114^B may be added, spaced from the sprockets 112, 114 and a loading and unloading platform 25^B placed between them at or above the level of the pier floor.

From this description it is believed the construction, operation and use of the apparatus will be clearly evident to those versed in the art and that the same fulfills the several purposes and objects set forth.

The foregoing disclosure is to be regarded as descriptive and illustrative only, and not as restrictive or limitative of the invention of which obviously an embodiment may be constructed including many modifications without departing from the general scope herein indicated and denoted in the appended claims.

What I claim is:

1. A cargo handling apparatus comprising a bridge, a substantially horizontal arm extending outwardly therefrom, a rigid pier leg depending from the bridge, a ship leg depending from the arm, and conveying means associated with the arm and legs for transferring cargo to or from a ship.

2. A cargo handling apparatus comprising a bridge, a substantially horizontal adjustable arm extending outwardly therefrom, a rigid pier leg depending from the bridge, a ship leg depending from the arm, and conveying means associated with the arm and legs for transferring cargo to or from a ship.

3. A cargo handling apparatus comprising a bridge, a substantially horizontal adjustable arm extending outwardly therefrom, a rigid pier leg depending from the bridge, an adjustable ship leg depending from the arm, and conveying means associated with the arm and legs for transferring cargo to or from a ship.

4. A cargo handling apparatus comprising a bridge, a substantially horizontal arm extending outwardly therefrom, a rigid pier leg depending from the bridge, an adjustable ship leg depending from the arm, and conveying means associated with the arm and legs for transferring cargo to or from a ship.

5. A cargo handling apparatus comprising a bridge, a substantially horizontal arm extending outwardly therefrom, a rigid pier leg depending from the bridge, a ship leg depending from the arm, and an endless conveyer associated with the arm and legs for transferring cargo to or from a ship.

6. A cargo handling apparatus comprising a bridge, a rigid pier leg depending therefrom, a substantially horizontal adjustable arm extending outwardly from the bridge, a ship leg carried by the arm, and an endless conveyer associated with the arm and legs for transferring cargo to or from a ship.

7. In combination with a cargo handling apparatus, a frame disposable on the deck of the ship, a ship leg movable through said frame, and means on said frame for raising and lowering said leg relative to the frame.

8. In combination with a cargo handling apparatus, a frame having suitable points of support on the deck of the ship over the hatch-way, a pendantly supported ship leg movable through said frame, and power driven means on said frame for raising and lowering said leg relative to the frame.

9. In combination with a cargo handling apparatus, a ship deck frame arranged to rest upon a part of a ship, a ship leg arranged to be partially supported by said frame, means for relative adjustment therebetween, and means for raising said frame and leg coincidentally.

10. In combination with a cargo handling apparatus, a horizontally movable arm, a ship leg relatively adjustable in said arm, means normally permitting a swaying movement of the leg, and means for holding the leg at a fixed angle to said arm.

11. In combination with a cargo handling apparatus, a horizontally movable arm, a ship leg vertically adjustable in said arm, means in said arm normally permitting a swaying movement of the leg, means for rigidly clamping said leg to said arm, and means carried on board the ship for adjustably supporting said leg.

12. In combination with a cargo handling apparatus, comprising a bridge having an extensible horizontal arm and an endless conveyer movable therethrough, of a sectional track in said arm for said conveyer, and means for removing or replacing sections of said track as said arm is extended or retracted relative to said bridge.

13. In combination with a cargo handling apparatus, comprising a bridge having an extensible horizontal arm and an endless conveyer movable therethrough, of a plurality of track sections in said arm for the conveyer, toggle levers for raising or lowering said track sections into operative or inoperative positions, and a single cam in said bridge whereby said levers are actuated as said arm is moved relative to said bridge.

14. A cargo handling apparatus comprising a bridge, an arm extending outwardly therefrom, a pier leg depending from the bridge, a ship leg extending vertically through said arm, an endless conveyer associated with the arm and legs, and means for adjusting the ship leg vertically without disturbing the effective length of the conveyer.

15. A cargo handling apparatus comprising a bridge, an arm extending outwardly therefrom, a pier leg depending from the bridge, an adjustable ship leg adjustable vertically through said arm, an endless conveyer associated with the arm and legs, and take-up means to keep said conveyer taut.

16. A cargo handling apparatus comprising a bridge, an arm extending outwardly therefrom, a pier leg depending from the bridge, a ship leg depending from the arm, an endless conveyer associated with the arm and legs for transferring cargo to or from a ship, and means for adjusting the ship leg vertically without disturbing the effective length of the conveyer.

17. A cargo handling apparatus comprising a bridge, an adjustable arm extending outwardly therefrom, a pier leg depending from the bridge, an adjustable ship leg depending from the arm, an endless conveyer associated with the arm and legs for transferring cargo to or from a ship, and take-up means to keep said conveyer taut.

18. A cargo handling apparatus comprising a bridge, a transversely adjustable arm extending horizontally therefrom, a pier leg depending from the bridge, a vertically adjustable ship leg pivotally engaged on the arm, an endless conveyer associated with the arm and legs, and automatic take-up means for compensating for the variations in position of the ship leg to keep the conveyer taut.

19. A cargo handling apparatus comprising a bridge adapted for movement longitudinally of a pier, an arm extending outwardly from the bridge, a pier leg depending from the bridge, a ship leg depending from the arm, means for rigidly clamping said ship leg to said arm, and conveying means associated with the arm and legs for transferring cargo to or from a ship.

20. A cargo handling apparatus comprising a bridge adapted for movement longitudinally of a pier, a transversely adjustable arm extending outwardly from the bridge, a pier leg depending rigidly from the bridge, a vertical adjustable ship leg at the outer end of the arm, means for raising and lowering said ship leg, and conveying means associated with the arms and legs for transferring cargo to or from a ship.

21. A cargo handling apparatus comprising a bridge adapted for movement longitudinally of a pier, a horizontally adjustable arm extending outwardly from the bridge, a pier leg depending from the bridge, a vertically adjustable ship leg at the outer end of the arm, an endless conveyor associated with the arm and legs, and an automatic take-up means to keep the conveyor taut.

22. A cargo handling apparatus comprising a bridge adapted for movement longitudinally of a pier, a horizontally adjustable arm extending outwardly from the bridge, a pier leg depending from the bridge, a vertically adjustable ship leg at the outer end of the arm, an endless conveyor associated with the arm and legs, and an automatic take-up means to keep the conveyor taut.

23. A cargo handling apparatus comprising a bridge adapted to travel longitudinally on a pier, raised track supports for said bridge, a cantilever arm movable transversely in said bridge, a pier leg rigidly carried by the bridge, a ship leg flexibly and adjustably carried by said arm parallel to said pier leg, a support for said ship leg, a conveyor movable circuitously through said legs and arm, and main and supplementary drives for said conveyor.

24. A cargo handling apparatus comprising a bridge adapted to travel longitudinally on a pier, raised track supports for said bridge, a cantilever arm movable in said bridge, a pier leg rigidly carried by the bridge, a ship leg movable vertically through said arm, an independent support for said ship leg, means for adjusting the relative height of said ship leg and support, and means for collectively raising or lowering said ship leg and support relative to said arm.

25. A cargo handling apparatus comprising a bridge adapted to travel longitudinally on a pier, raised track supports for said bridge, a cantilever arm movable in said bridge, a pier leg rigidly carried by the bridge, a ship leg adjustably carried by said arm, an endless conveyor adapted to travel circuitously through said arm and legs, lateral guides for said conveyor in said legs, sectional conveyor tracks in said arm, means for automatically removing or replacing sections of said track as said arm is actuated, means for stressing said conveyor, and a station on said bridge from whence all movements of the apparatus are controlled.

26. A cargo handling apparatus comprising a travelling pier bridge, a cantilever arm movable therein, a pier leg fixed to said bridge, a ship leg adjustably supported by said arm, independent actuating means for said bridge, arm and ship leg, an endless conveyor capable of traveling in either direction circuitously through said arm and legs, and a plurality of drives for said conveyor, all of said driving means being controlled from a central station.

27. A cargo handling apparatus having extensible elements, certain of said elements being movable horizontally, others vertically, all being movable laterally, an endless conveyor movable circuitously, loading and unloading stations in the vertical elements, means at said stations for automatically engaging articles on said conveyors, other means at said stations for loading said conveyor, and means for taking up the slack in said conveyor due to adjusting said elements.

28. In a cargo conveying apparatus comprising a circuitous track and a traveling conveyor including a plurality of trays having bottoms comprised of parallel arms supported at the rear and movable thereover, stations arranged adjacent said track, stripping fingers at said stations enterable between the arms of said trays during their passage, a vertically adjustable support for said fingers, and means for moving said fingers out of the path of said trays.

29. In a cargo conveying apparatus comprising a circuitous track, carrier and drive sprockets along said track, chains arranged in parallel over said sprockets, and main and supplementary means for driving said sprockets.

30. In a cargo conveying apparatus comprising a circuitous track, carrier and drive sprockets along said track, certain of said sprockets being in a plane offset laterally to others, chains adapted to operate in parallel over said sprockets, and means in said chains permitting their following a laterally angular path.

31. In a cargo conveying apparatus comprising a circuitous track, sprockets disposed in paired relation along said track, chains engaging said sprockets, bails engaging said chains, trays hingedly connecting each pair of bails hanging pendant from said chains, and means for actuating certain of said sprockets whereby said trays are advanced.

32. In a cargo conveying apparatus comprising a circuitous track, sprockets disposed in paired relation along said track, chains engaging said sprockets, bails engaging said chains, trays hingedly connecting each pair of bails hanging pendant from said chains, guide channels contiguous to said chains, and rollers carried by said bails operable in said guides.

33. A conveyer tray comprising a pair of side plates, a rear wall engaged thereto, a plurality of spaced arms rigidly fixed in said rear wall extending to the front, said arms being bent concavely intermediate their ends, and bail elements attached to said tray.

34. A conveyer tray comprising a pair of side plates, a rear wall engaged thereto, a plurality of spaced arms rigidly fixed in said rear wall extending to the front, said arms being bent concavely midway their length, and bail elements attached to said side plates.

35. A conveyer tray comprising a pair of side plates, a rear wall engaged thereto, a plurality of forwardly extending spaced arms fixed to said rear wall, said arms being downwardly bent intermediate their ends, reinforcing strips at the upper edge of said side plates, and raising elements attached to said strips.

36. A conveyer tray comprising a pair of side plates, a rear wall engaged thereto, reinforcing elements on said wall, arms rigidly secured at intervals to said wall and reinforcement, reinforcing strips secured to the upper outer edges of said side plates, lifting elements fastened to said strips and plates, and guide elements on said plates.

37. A conveyer tray comprising side plates, a back wall, spaced arms extending from said wall parallel with said plates forming the bottom of the tray, and bail elements hingedly engaged to said side elements.

38. A conveyer tray comprising side plates, a rear wall, arms secured in spaced relation to said rear wall, said arms being curved concavely, pairs of vertical guides extending outwardly from said plates, and bail elements hinged to said plates centrally of said guides.

39. A conveyer tray open at the front and having closed side and rear walls, a plurality of spaced arms rigidly connected with the rear wall, means for guiding the tray when moving vertically, bail elements hingedly engaged to the side walls permitting lateral movement, and one or more rollers longitudinally adjacent to said side walls.

40. A conveyer tray open at the top and front and having closed side and rear walls, a grid bottom fixed in the rear wall, bails flexibly engaged at the sides, said bails being attached to conveyer chains, and roller supports carried by the attaching means.

41. A conveyer tray having an open grid bottom, bails hinged to swing laterally on the sides of the tray, studs fixed to extend outwardly from the upper ends of said bails, rollers journaled on said studs, conveyer chains, and connections between said studs and the conveyer chains.

42. A conveyer tray comprising raised side and rear walls, spaced arms projecting to the front from the lower portion of said rear wall, bails inclinably secured to said side walls, vertical guide elements on the side walls, and rollers combined with said guides adapted to contact with the trackway over which the tray is moved when said bails are in an inclined position.

43. A conveyer chain comprised of strap link elements bent to form loops at one end, the loops of one element being forked, the loop of the engaging element entering between the mating fork, and a pivot passing through the loops uniting the link elements, permitting the link to bend laterally.

44. A conveyer chain comprised of strap link elements, pivots connecting the ends of said elements, rollers mounted on said pivots between the side members, and means in each alternate link permitting lateral bending thereof.

45. A conveyer chain comprised of strap link elements, pivots connecting the ends of said elements, each alternate link having tongue and groove connections in the bights formed by the straps, a pivot passed through the bights, and means on the ends of said pivots adapted to prevent displacement.

46. A conveyer chain comprised of strap link elements, pivots connecting the ends of said elements, each alternate link being in sections and each section bent to present a loop, said loops being interengaged at their bights by tongue and groove elements, pivots fitted to the bights of said loops, and extending flanges on the ends of said pivots engaging, when in one position, the edges of the loops and capable of passing through the loops when in another position.

47. A conveyer chain comprised of strap link elements, each alternate link being in two sections, pivots connecting the ends of said links, other pivots connecting between the elements of the sectional link in a plane at right angles to the first named pivots, rollers mounted on the first named pivots interjacent the straps, and rollers mounted on the second named pivots adjacent their extending ends.

48. A conveyer chain comprised of strap link elements, each alternate link being in two sections, pivots connecting the ends of said links, other pivots connecting between the elements of the sectional link in a plane at right angles to the first named pivots, bolts passing axially through the second named pivots, rollers mounted on both ends of said bolts, and single rollers mounted on the first named bolts between the strap elements which they connect.

49. A conveyor chain comprised of strap link elements, each alternate link being in two sections, pivots connecting the ends of said links, other pivots connecting between the elements of the sectional link in a plane at right angles to the first named pivots, bolts passing axially through the second named pivots, rollers mounted on both ends of said bolts, single rollers mounted on the first named bolts between the strap elements which they connect, and carrier links disposed at intervals in the lengths of the chain.

50. A cargo handling apparatus comprising a frame having pendant members, chain operated trays movable circuitously through said frame and members, means for actuating the chain, and devices adapted to cause cessation of said operating means upon contact with articles in said trays extending beyond the loading area thereof.

51. A cargo handling apparatus comprising a frame having pendant members, chain operated trays movable circuitously through said frame and members, electrically driven means for actuating the tray chains, and electric switches arranged in said pendant members adjacently above loading stations therein, said switches being adapted to be opened by contact with articles extending beyond the load line of the trays on which they are carried.

52. In a cargo handling apparatus, the combination with a plurality of traveling trays, a platform hinged to the frame in which said trays operate, supports for said platform when extended, and means for adjusting the height of said platform.

53. In a cargo handling apparatus, the combination with a plurality of traveling trays, a platform hinged to the frame in which said trays operate, supports for said platform when extended, wings hingedly engaging the ends of said platform, and means for adjusting the inclination of said wings.

54. In a cargo handling apparatus, the combination with a plurality of traveling trays each having forked bottoms, a frame in which said trays operate, an exterior vertical track-way on said frame, a second frame, movable on said track-way, lifting means for said second frame, and a plurality of bars pivotally connected with said second frame and adapted to be swung into the path of said trays intermediate the forks thereof.

55. In a cargo handling apparatus, the combination with a plurality of traveling trays each comprising spaced bars secured at their rear ends and open at the front, a vertical frame in which said trays are actuated, beams hingedly engaged with said frame, means for supporting said beams when extended substantially horizontally, and trolleys movable on said beams.

In witness whereof, I have hereunto set my hand this 3d day of May, 1922.

ARTHUR T. PRESCOTT.